United States Patent
Uematsu

(10) Patent No.: US 7,362,601 B2
(45) Date of Patent: Apr. 22, 2008

(54) POWER SUPPLY DEVICE

(75) Inventor: Takeshi Uematsu, Tokyo (JP)

(73) Assignee: TDK Corporation, Tokyo (JP)

( * ) Notice: Subject to any disclaimer, the term of this patent is extended or adjusted under 35 U.S.C. 154(b) by 119 days.

(21) Appl. No.: 11/360,397

(22) Filed: Feb. 24, 2006

(65) Prior Publication Data
US 2006/0193154 A1   Aug. 31, 2006

(30) Foreign Application Priority Data
Feb. 28, 2005   (JP) .............................. 2005-052547

(51) Int. Cl.
*H02M 7/217* (2006.01)
(52) U.S. Cl. ...................... 363/127; 363/123; 363/125; 363/132; 307/44; 307/45; 307/46; 307/48; 307/66; 307/87
(58) Field of Classification Search ................ 363/123, 363/125, 127, 132; 307/44–46, 48–49, 64–66, 307/87
See application file for complete search history.

(56) References Cited

U.S. PATENT DOCUMENTS

| | | | |
|---|---|---|---|
| 5,019,952 A | * | 5/1991 | Smolenski et al. ........... 363/16 |
| 6,288,920 B1 | * | 9/2001 | Jacobs et al. ................ 363/127 |
| 6,407,934 B1 | * | 6/2002 | Ishii et al. ................ 363/21.14 |
| 6,788,557 B2 | * | 9/2004 | Phadke ..................... 363/21.16 |
| 7,167,384 B2 | * | 1/2007 | Yasumura ................... 363/127 |
| 2007/0076446 A1 | * | 4/2007 | Shiga et al. .................. 363/17 |

FOREIGN PATENT DOCUMENTS

| | | |
|---|---|---|
| JP | A 5-260750 | 10/1993 |
| JP | A 8-298769 | 11/1996 |
| JP | A 2003-116233 | 4/2003 |
| JP | A 2004-048938 | 2/2004 |

* cited by examiner

*Primary Examiner*—Bao Q. Vu
*Assistant Examiner*—Stuart Hansen
(74) *Attorney, Agent, or Firm*—Oliff & Berridge, PLC

(57) ABSTRACT

A power supply device includes two input ports, two output ports, a transformer having primary and secondary windings, a switch device, and a controller. The switch device includes a switching element connected in series with the primary winding, and a capacitor. The controller switches the switching element to energize the transformer and charge the capacitor. When an AC power failure such as instantaneous interruption occurs, energy stored in the capacitor is discharged to flow through the primary winding. Accordingly, the transformer is energized to maintain generating an output power from the power supply device for a certain time period. The capacitor is provided on a primary side of the transformer, generally higher voltage side, in the power supply device, so that a smaller capacitance of the capacitor can be used.

8 Claims, 4 Drawing Sheets

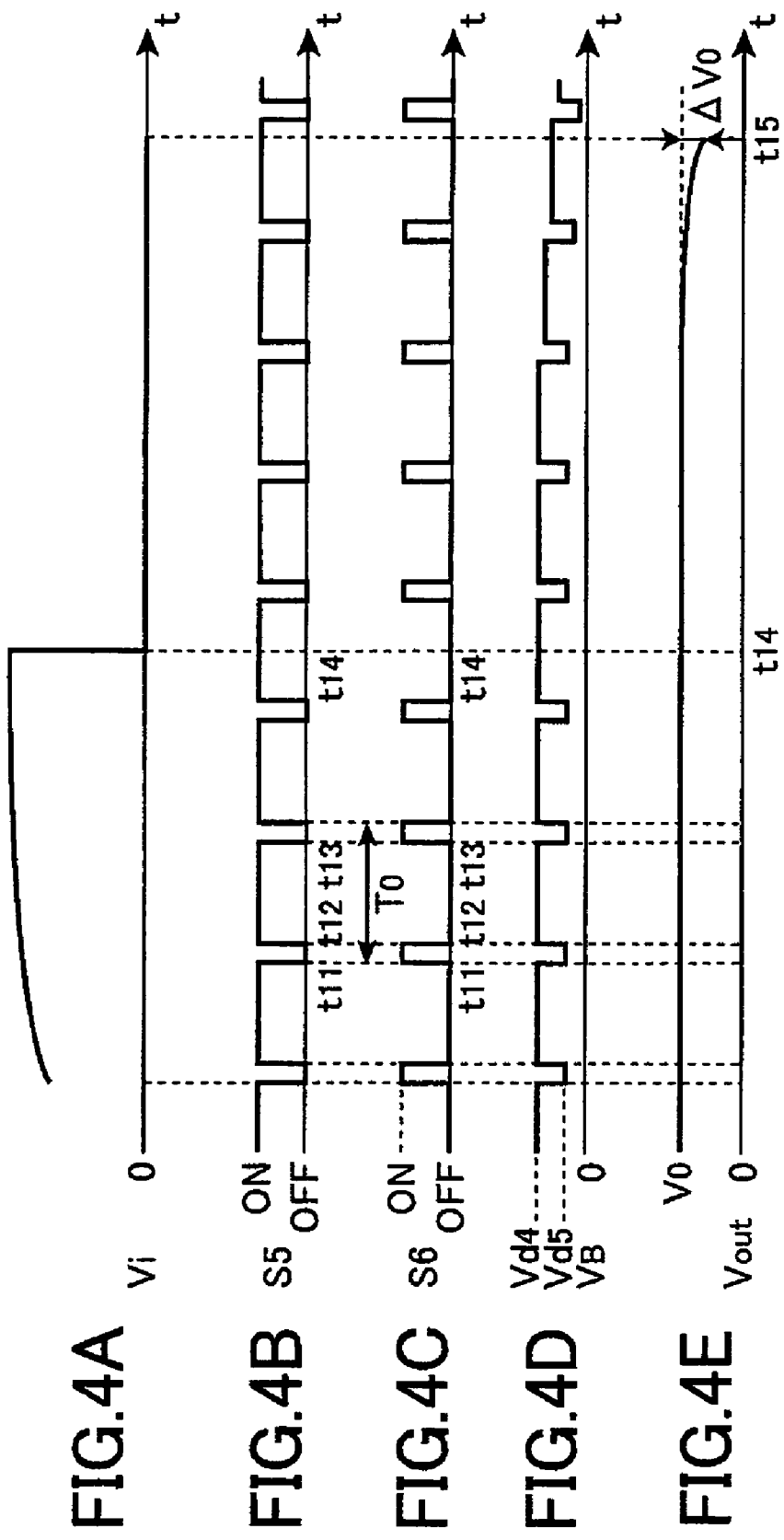

POWER SUPPLY DEVICE

BACKGROUND OF THE INVENTION

1. Technical Field

This invention relates to a power supply device. The present invention relates to a power supply device used for a back light of a liquid crystal display device, and an electronic device such as a personal computer. Particularly, the present invention relates to an uninterruptible power supply (UPS) which supplies power when an input voltage from a power supply accidentally drops below a predetermined value.

2. Related Art

A power supply circuit used for an electronic device is required to maintain feeding electric power for a predetermined time period after an electric failure such as an abrupt voltage drop and/or an instantaneous interruption occurs. If the electronic device is fed at least for the predetermined time period after the above electric failure, malfunction and/or breakdown of the electronic device caused due to the above electric failure can be prevented. Hence, installation of an auxiliary power supply is indispensable for protecting the electric device from the electric failure.

For example, Japanese Patent Application Publication HEI 08-298769 (JP 08-298769) discloses a switching power supply having an auxiliary power supply. The power supply device is proposed in which a secondary winding is added to a reactor constituting an active filter in a step-up chopper, and a higher frequency AC voltage is taken out from the secondary winding as an input of the auxiliary power supply. The switching power supply includes the auxiliary power supply so that activation and suspension of the power supply can be controllable from an external device.

However, the power supply device does not have any mechanism for ensuring the sufficient holding time to maintain the feed of the electric power by the power supply device. As a result, a problem may arise that the feed from the power supply device is stopped.

On the other hand, an insulation type of power supply device is disclosed for insulating an input side from an output side through a transformer provided therebetween. This power supply device includes a capacitor on a secondary side of the transformer for storing electric energy and ensuring feed of electric power to a load for a certain time period after an instantaneous interruption, i.e., a holding time period.

However, the insulation type of power supply device has the following possible disadvantages. Generally, the secondary side of the transformer in the power supply device has a lower voltage than a voltage of the primary side. Energy stored in the capacitor is expressed by $CV^2/2$ (C is a capacitance of the capacitor, and V is a voltage across the capacitor), and is proportional to the square of the voltage across the capacitor. Since the voltage of the secondary side is generally low, a larger capacitance of the capacitor is required to ensure the desired holding time period. This structure results in upsizing of the power supply device.

An object of the present invention is to provide a power supply device which ensure sufficient feed of electric power to an electric and/or electronics device connected thereto for a certain time period after an input voltage to the power supply device falls to or less than a predetermined value.

SUMMARY

The present invention provides a power supply device having first and second input ports, a transformer, and a switching circuit. The first and second input ports receive alternating current having an input voltage. The transformer has a primary winding and a secondary winding. The primary winding has a pair of winding terminals, one of which is connected to the first port. The switching circuit is connected between an other of pair of winding terminals and the second port. The switching circuit includes first, second, third, and forth switching elements and a capacitor. The first and second switching elements is connected to the other of pair of winding terminals, respectively. The third switching element is connected between an other end of the first switching element and the second port. The forth switching element is connected between an other end of the second switching element and the second port. The capacitor is connected between a connecting point of the first and third switching elements and another connecting point of the second and forth switching elements. The capacitor is charged with energy obtained by the primary winding during a normal operation of the power supply device. The energy stored in the capacitor is supplied to the transformer through a current path provided between the first input port and the second input port to continue feed of electric power to the secondary winding when the input voltage decreases to or less than a predetermined value.

The present invention provides a power supply device having first and second input ports, a transformer, and a switching circuit. The first and second input ports receive alternating current. The transformer has a primary winding and a secondary winding. The primary winding has a pair of winding terminals, one of which is connected to the first port. The switching circuit is connected between an other of pair of winding terminals and the second port. The switching circuit includes first and second switching elements, and first and second capacitors. The first and second switching elements is connected to the other winding end of the primary winding, respectively. The first capacitor is connected between the other end of the switching element and the second port. The second capacitor is connected between the other end of the second switching element and the second port. The capacitor is charged with energy obtained by the primary winding during a normal operation of the power supply device. The energy stored in the first and second capacitor is supplied to the transformer through a current path provided between the first port and the second port to continue feed of electric power to the secondary winding when the input voltage decreases to or less than a predetermined value.

The present invention provides a power supply device having two input ports, two output ports, a transformer, switching means, a second capacitor, and a controller. The two input ports receive input alternating current power having an input voltage. The transformer has a primary winding and a secondary winding, the primary winding having a first winding terminal connected to one of the two input ports and a second winding terminal, the secondary winding being connected to the two output ports. The switching means is connected in series with the primary winding through the second winding terminal, the series-connected primary winding and switching means being connected to the two input ports. The switching means includes first, second, third, and forth switching elements and a first capacitor. The first switching element is connected in series with the second switching element through a first node. The series connected first and second switching elements is connected between the second winding terminal and the other of the two input ports. The third switching element is connected in series with the forth switching element through a second node. The series connected third and forth switching elements is connected between the second winding terminal and the other of the two input ports. The first capacitor is connected between the first and second nodes. The second capacitor is connected in parallel to the series-connected primary winding and switching means. The controller switches the first, second, third, and forth switching elements to charge the first capacitor periodically. Electrical energy stored in the first capacitor is discharged to the primary winding when the input voltage decreases to or less than a predetermined value, thereby continuing feed of power to the transformer.

The present invention provides a power supply device having two input ports, two output ports, a transformer, switching means, a third capacitor, and a controller. The two input ports receive input alternating current power having an input voltage. The transformer has a primary winding and a secondary winding. The primary winding has a first winding terminal connected to one of the two input ports and a second winding terminal. The secondary winding is connected to the pair of output ports. The switching means is connected between the second winding terminal and the other of the two input ports. The switching means includes a first switching element and a first capacitor which are connected in series to each other between the second winding terminal and the other of the two input ports, and a second switching element and a second capacitor which are connected in series between the second winding terminal and the other of the two input ports. The third capacitor is connected in parallel to the series-connected primary winding and switching means. The controller switches the first and second switching elements to charge the first and second capacitors, respectively. Electrical energy stored in the first and second capacitors is discharged to the primary winding when the input voltage decreases to or less than a predetermined value, thereby continuing feed of power to the transformer.

BRIEF DESCRIPTION OF THE DRAWINGS

The aforementioned aspects and other features of the invention are explained in the following description, taken in connection with the accompanying drawing figures wherein:

FIGS. 4A-4E are waveform charts showing an input voltage $V_i$, conditions of switches S5 and S6, a voltage $V_B$, and an output voltage $V_{out}$.

DESCRIPTION OF THE EMBODIMENT

Figure 1:
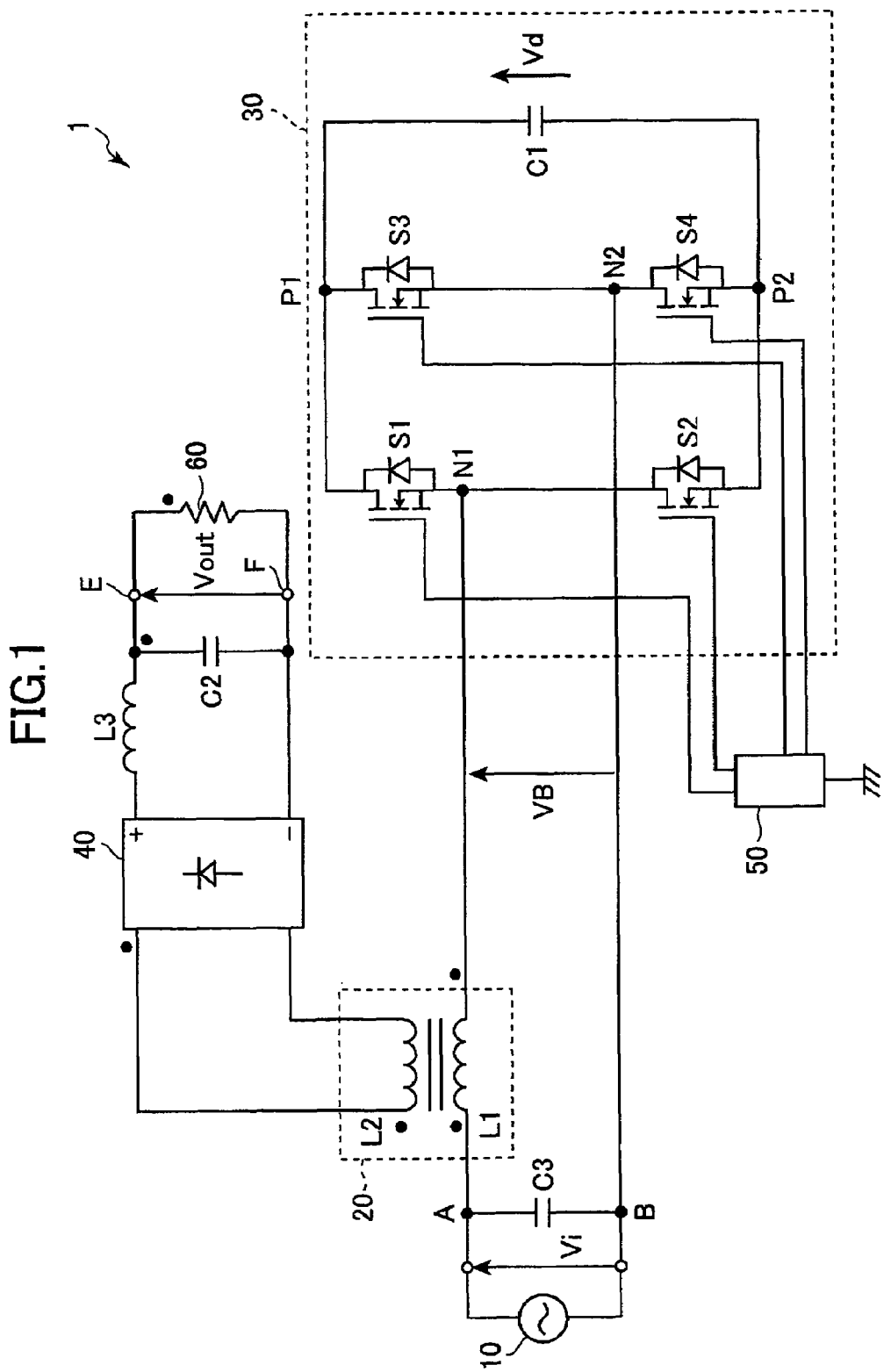
FIG. 1 is a circuit diagram showing a power supply device of a first embodiment according to the present invention.

Embodiments of the present invention will be described by referring to the accompanying drawings. Referring to FIG. 1, a power supply device 1 of a first embodiment has an Alternating current (AC) power supply 10, a transformer 20, a switching unit 30, a rectifier circuit 40, and a controller 50.

The AC power supply 10 is a commercial power supply to feed an AC voltage Vi having a frequency of 50 Hz. The AC power supply 10 is connected to input ports A and B.

The transformer 20 has a primary winding L1 and a secondary winding L2 having a turns ratio of n:1. The primary and secondary windings L1, L2 are arranged so that a polarity of the primary winding L1 is identical to a polarity of the secondary winding L2. The primary winding L2 has two winding terminals. The primary winding L1 is connected to the port A through one of the winding terminals.

The switching unit 30 is provided as an auxiliary power supply and includes two terminals N1, N2 through which a current flows in/out, four switching elements S1-S4, and a capacitor C1. The terminal N1 is connected to the other winding terminal of the primary winding L1. The terminal N2 is connected to the port B.

The switching element S1 and the switching element S3 are connected in series through a connecting point P1 between the terminals N1 and N2. The switching element S2 and the switching element S4 are connected in series through a connecting point P2 between the terminals N1 and N2. The switching elements S1-S4 are made from field-effective transistors (FET). A switching operation of each switching element S1-S4 is controlled by a corresponding control signal from the controller 50. The capacitor C1 is connected between the connecting points P1 and P2. The capacitor C1 has a capacitance of 300 µF.

The rectifier circuit 40 is a full-wave rectifier circuit made from a diode bridge. The rectifier circuit 40 is connected to both winding terminals of the secondary winding L2.

An inductor L3 and a capacitor C2 are connected in series. The series-connected inductor L3 and capacitor C2 are connected to an output side of the rectifier circuit 40. Both ends of the capacitor C2 are provided as output ports E and F. An electronic device 60 such as a liquid crystal display device is connected as a load to the output ports E and F.

Further, a capacitor C3 is connected between the input ports A and B to form a closed circuit including the switching unit 30.

The controller 50 generates the control signal for opening and closing the corresponding switching element S1-S4. The controller 50 complementarily turns on the switching element S1 and the switching element S2 not to simultaneously close both switching elements S1 and S2. The controller 50 complementarily turns on the switching element S3 and the switching element S4 not to simultaneously close both switching elements S3 and S4. The controller 50 can regulate pulse durations of the control signals, respectively, depending on the instantaneous amplitude of the AC voltage Vi, to maintain a voltage $V_{out}$ appearing between the output ports E and F constant.

As described above, the power supply device 1 is configured.

Subsequently, the operation of the power supply device 1 will be described by referring to FIG. 1 and FIGS. 2A-2G. In this description, a voltage $V_B$ between the terminals N1 and N2 is defined as the terminal N1 is at a higher potential than the terminal N2. A voltage $V_d$ across the capacitor C1 is defined as the connecting point P1 is at a higher potential than the connecting point P2.

First, a normal operation of the power supply device 1 will be described. The AC power supply 10 outputs an AC voltage $V_i$ having a frequency of 50 Hz to the input ports A and B (See FIG. 2A). The switching operations of the switching elements S1 to S4 are controlled by the control circuit 50 as shown in FIGS. 2B-2E. Here, the switching elements S1 and S2, and the switching elements S3 and S4 are switched in a complementary manner.

In other words, at a time $t_1$, the switching element S1 turns ON, and The switching element S2 turns OFF. Then at a time $t_4$, the switching element S1 turns OFF and the switching element S2 turns ON. At a time $t_5$, the switching element S1 again turns ON, and The switching element S2 turns OFF. Thus, the switching elements S1 and S2 repeats the above complementary switching at a switching frequency of $1/T_0$ ($T_0$=a duration of $t_5$–$t_1$). The switching frequency is much higher than the frequency of the input voltage Vi from the AC power supply 10.

From the time $t_1$ to a time $t_2$ before the time $t_4$, the switching element S3 is open, or OFF, and the switching element S4 is closed, or ON. At the time $t_2$, the switching element S3 turns ON. Simultaneously, the switching element S4 turns OFF. At a time $t_3$ after the time $t_2$, the switching element S3 turns OFF and the switching element S4 turns ON. At a time $t_6$ after a lapse of one cycle $T_0$ from the time $t_2$, the switching element S3 turns ON and the switching element S4 turns OFF. Thus, the switching elements S3 and S4 repeats the above complementary switching at a switching frequency of $1/T_0$.

As described above, during a period from the time $t_1$ to the time $t_2$, the switching elements S1 and S4 are ON, and the switching elements S2 and S3 are OFF. Accordingly, a current path including the capacitor C1 is formed between the terminals N1 and N2 so that The capacitor C1 is charged by the AC power supply 10 and the primary winding L1. During this period, the voltage $V_B$ between the terminals N1 and N2 becomes equal to the voltage $V_d$ across the capacitor C1.

During a period from the time $t_2$ to the time $t_3$, the switching elements S1 and S3 are ON, and the switching elements S2 and S4 are OFF, so that a current path between the terminals N1 and N2 does not include any electric part. Accordingly, the voltage $V_B$ becomes zero.

From a period from the time $t_3$ to the time $t_4$, the switching elements S1 and S4 are ON, and the switching element S2 and S3 are OFF. Accordingly, a current path including the capacitor C1 is formed again so that the capacitor C1 is charged by the AC power supply 3 and the primary winding L1. During this period, the voltage $V_B$ becomes equal to the $V_d$ across the capacitor C1.

During a period from the time $t_4$ to the time $t_5$, the switching elements S1 and S3 are OFF, and the switching elements S2 and S4 are ON, so that a current path is formed not to include the capacitor C1 between the terminal N1 and N2. Accordingly, the voltage $V_B$ becomes zero.

As described above, the controller 50 controls the switching elements S1 to S4. Accordingly, the transformer 20 is energized by a current passing through the primary winding L1 to transfer energy to the secondary winding L2.

On the output side of the transformer 20, a voltage is induced across the secondary winding L2 based on the turns ratio and a change in the current flowing through the primary winding L1. The induced voltage is rectified by the rectifier circuit 40. The rectified voltage is smoothed by the inductor L3 and the capacitor C2. The smoothed voltage appears between the output ports E and F, as the output voltage $V_{out}$. In the normal operation of the power supply device 1, the output voltage $V_{out}$ becomes a direct current (DC) voltage value $V_0$, as shown in FIG. 2G.

Moreover, the control circuit 50 adjusts a duration of the control signals for the switching elements S1 to S4. Therefore, the waveform of the current flowing to the primary winding L1 is adjusted, so that the output voltage $V_o$ can be changed.

Then, the operation after an AC power failure will be described. In this description, the AC power failure means a temporary voltage drop, temporary blackout, instantaneous interruption, and shut off and shut down of electric power.

Assuming that an AC power failure occurs at a time $t_7$ and the voltage $V_i$ becomes zero, a current path including the capacitor C1 is formed when the switching elements S1 and S4 are ON and the switching elements S2 and S3 are OFF. This is because the switching operations of the switching elements S1 to S4 are continued by the controller 50 regardless of the AC power failure.

At this time, the capacitor C3 functions to pass a current flow therethrough between the input ports A and B. After the AC power failure occurs, a closed current circuit is formed to include the primary winding L1, the capacitor C1, and the capacitor C3. The capacitance of the capacitor C3 is substantially smaller than the capacitance of the capacitor C1. Accordingly, Electrical energy stored in the capacitor C1 is discharged to supply power to the primary winding L1.

During a period in which the switching elements S1 and S3 are ON and the switching elements S2 and S4 are OFF, and another period in which the switching elements S1 and S3 are OFF and the switching elements S2 and S4 are ON, a closed circuit including the primary winding L1 does not include the capacitor C1. Accordingly, the electric power in the capacitor C1 is not discharged to the primary winding L1. During these periods, the voltage $V_B$ becomes zero.

As described above, the electric energy stored in the capacitor C1 is discharged as a current flowing through the primary winding L1. Therefore, the transformer 20 is energized so that a voltage is induced across the secondary winding L2 depending on the turns ratio and a change in the current flowing through the primary winding L1. The induced voltage is rectified by the rectifier circuit 40. The rectified voltage is smoothed by the inductor L3 and the capacitor C2. Accordingly, the output voltage $V_o$ appears between the output ports E and F as the voltage $V_{out}$.

Figure 2A:
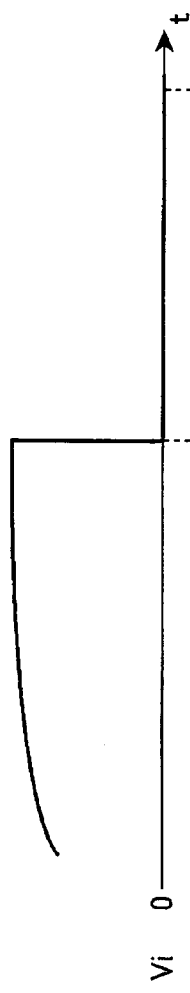
FIGS. 2A-2G are waveform charts showing an input voltage Vi, conditions of switches S1 to S4, a voltage $V_B$ across a switching unit, and an output voltage $V_{out}$.
Figure 2B:
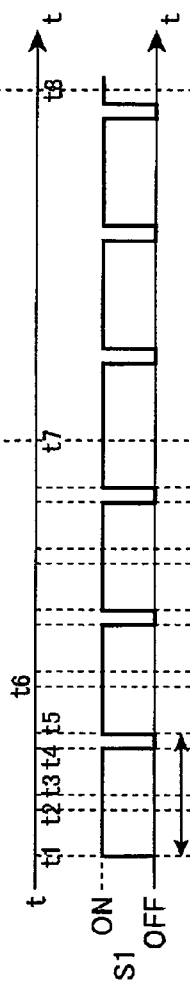
Figure 2C:
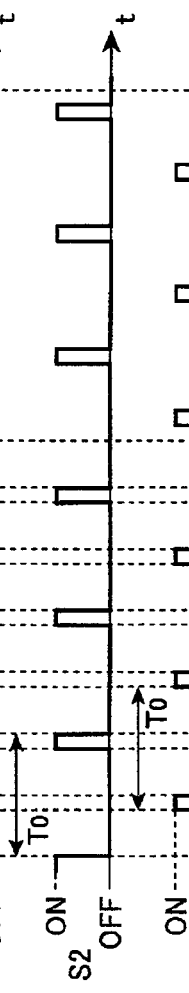
Figure 2D:
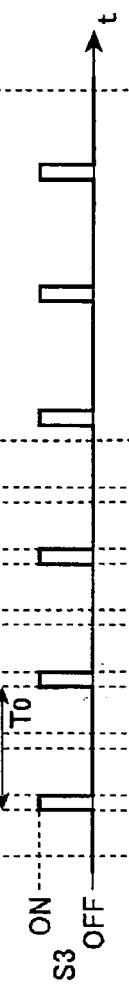
Figure 2E:
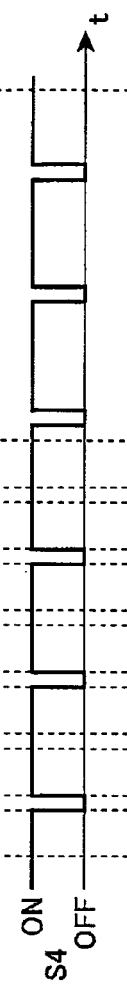
Figure 2F:
Figure 2G:
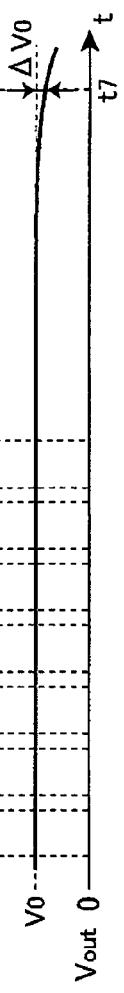

Since the electric energy of the capacitor C1 is consumed by the primary winding L1, the magnitude of the voltage $V_B$ gradually decreases (See FIG. 2F). Therefore, the output voltage $V_{out}$ also decreases as time elapses. At the time $t_8$, the voltage $V_{out}$ becomes $V_0$–$\Delta V$. If the voltage value $V_0$–$\Delta V$ is considered as a minimum drive voltage required for driving an electronic device connected to the output ports E and F, $t=t_8$–$t_7$ is a holding time to continue an operation of the electronic device after the AC power failure occurs. In this description, the holding time means a time period in which a voltage required to continue driving the electronic device 60 connected to the power supply device 1 is ensured.

As one example, in the case that the voltage of 400 volts is applied across the capacitor C1 by the AC power supply 3, and the holding time of 1.5 cycle or 30 ms is ensured, the capacitor C1 is required to have at least a capacitance of 300 μF.

As describe above, during the normal operation, the power supply device 1 feeds electric energy to the primary winding L1 to energize the transformer 20 by the switching operations of the switching elements S1 to S4, thereby generating the output voltage $V_{out}$. Simultaneously, the power supply device 1 charges the capacitor C1 by switching the switches S1 to S4.

After an AC power failure occurs, a closed circuit is formed to include the capacitor C1 and the primary winding L1 by the switching operations of the switching elements S1 to S4, so that electric energy stored in the capacitor C1 is discharged to flow through the primary winding L1 as a current. Thus, even after the AC power failure occurs, generation of an induced voltage across the secondary winding L2 is continued due to the current flowing the primary winding L1 and the switching operation of switching elements S1 to S4. Therefore, the output voltage $V_{out}$ can be continuously generated between the output ports E and F.

If the capacitance of the capacitor C1 is changed, a time length of the holding time can be adjusted. Thus, the desired length of the holding time can be assured, depending on the capacitance of the capacitor C1. Accordingly, malfunction and a suspension of the electronic device 60 can be prevented.

Furthermore, in the power supply device 1, the capacitor C1 for supplying the electric energy at the AC power failure is provided at the primary side of the transformer 20. Generally, the output voltage $V_{out}$ is set to about 40 volts. And, the configuration on the primary side of the transformer 20 in the power supply device 1 is a step-up circuit, so that a higher voltage than the secondary side of the transformer 20, for example, 400 volts is applied across the capacitor C1. Accordingly, a smaller capacitance of the capacitor C1 can be used for ensuring a desired holding time, as compared with a case in which a capacitor is provided on the secondary side of the transformer 20 for ensuring the same time length of the holding time. Therefore, smaller elements can be used for assembling the power supply device 1. And, the number of elements required to manufacture the power supply device 1 can be reduced. The cost for manufacturing the power supply device 1 can be reduced as well.

Furthermore, in the power supply device 1, the rectifier circuit is provided only on the secondary side of the transformer 20. Accordingly, the configuration of the power supply device 1 is simplified. The number of elements and the cost for manufacturing the power supply device 1 can be reduced. Moreover, the efficiency of the power generated on the secondary side of the transformer 20 can be improved.

The power supply device 1 switches the switching elements S1 to S4 to switch the current flow circuits on the primary side of the transformer 20, thereby improving a power factor thereof.

Figure 3:
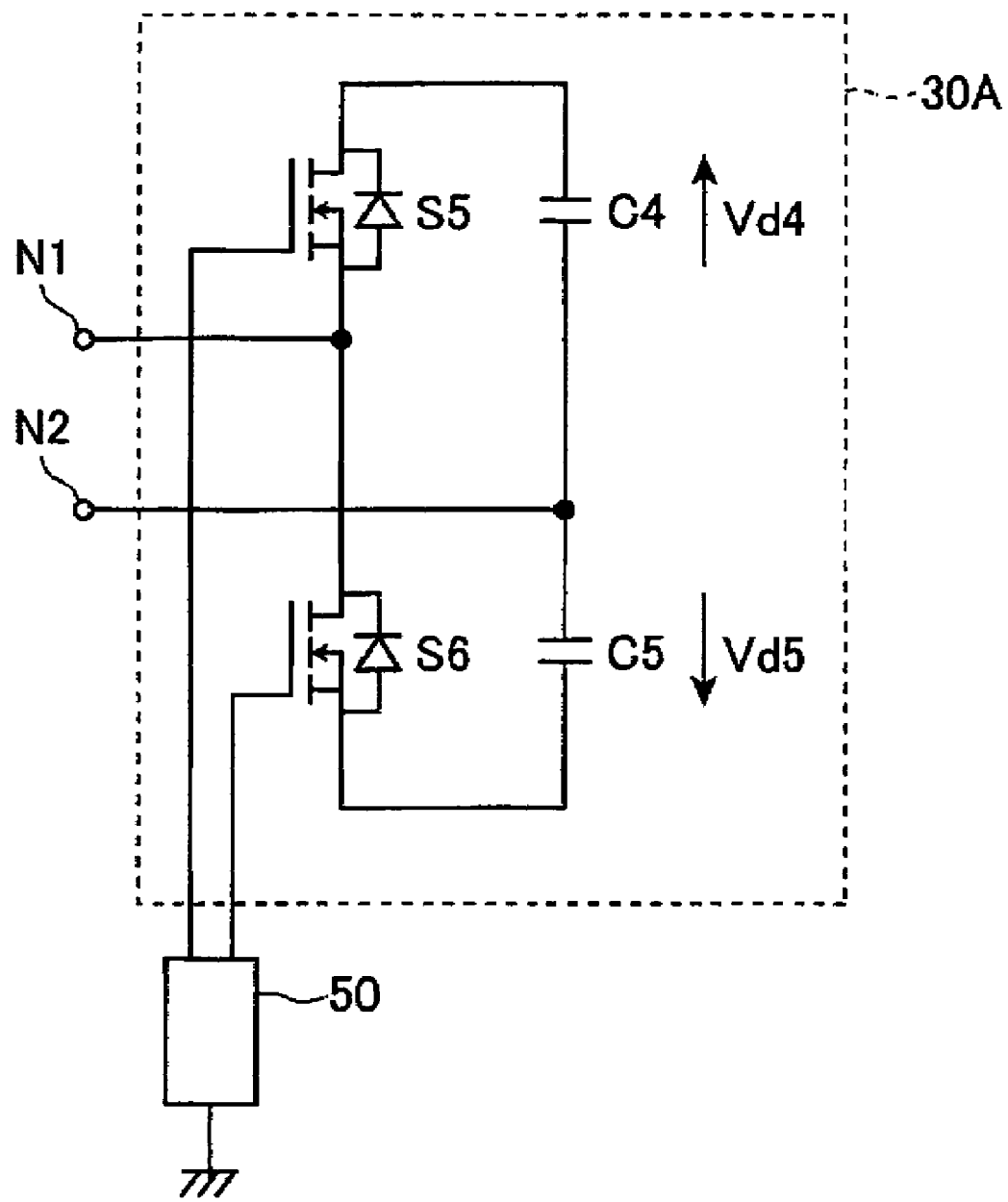
FIG. 3 is a circuit diagram showing another structure of a switching unit.

Next, a switching unit according to a second embodiment will be described while referring to FIGS. 3 and 4A-4E. FIG. 3 shows another configuration of a switching unit 30A used in the power supply device 1. Other units except the switching unit 30A are the same as those of the first embodiment, so that explanation of the other units will omitted hereinafter.

As shown in FIG. 3, the switching unit 30A has switching elements S5 and S6 and capacitors C4 and C5. The capacitors C4 and C5 are used for charging electric energy during the normal operation and discharging energy after an AC power failure occurs.

Both the switching elements S5 and S6 are formed from an FET. The switching element S5 is connected in series with the capacitor C4 between the terminals N1 and N2. The switching element S6 is connected in series with the capacitor C5 between the terminals N1 and N2. The controller 50 controls a switching operation of the switching elements S5 and S6, respectively.

The operation of the switching unit 30A will be described by referring to FIGS. 4A-4E. As shown in FIGS. 4B and 4C, the switching operations of the switching elements S5 and S6 are the same as the operations of the switching elements S1 and S2 of FIG. 1. The switching operations of the switches S5 and S6 are performed in a mutually complementary manner. The time period from the time $t_{11}$ to the time $t_{13}$ corresponds to a switching cycle $T_0$ of the switching elements S5 and S6.

First, the normal operation of the power supply device 1 will be described. From the time $t_{11}$ to the time $t_{12}$, the switching element S5 is OFF, and the switching element S6 is ON (See FIGS. 4B and 4C). Accordingly, a current path including the switching element S6 and the capacitor C5 is formed between the connecting terminal N1 and N2. The capacitor C5 is charged from the AC power supply 3 through the primary winding L1. At this time, the voltage $V_B$ becomes equal to the voltage $V_{d5}$ of the capacitor C5 (See FIG. 4D). In this embodiment, the voltage of the capacitors C4 and C5 is defined so that the electrode plate closer to the connecting terminal N1 is at a higher potential than the other electrode plate closer to the connecting terminal N2.

From the time $t_{12}$ to the time $t_{13}$, the switching element S5 is ON, and the switching element S6 is OFF (See FIGS. 4B and 4C). The current path including the switching element S5 and the capacitor C4 is formed between the connecting terminals N1 and N2. At this time, the capacitor C4 is charged from the AC power supply 3. The voltage $V_B$ becomes equal to the voltage $V_{d4}$ across the capacitor C4 (See FIG. 4D). The levels of the voltages $V_{d5}$ and $V_{d4}$ are determined depending on the length of each period. The controller 50 repeats the above switching operation of the switching elements S5 and S6 periodically. Thus, the current flow is flowing from the AC power supply 10 to the primary winding L1 so that the transformer 20 is energized to generate an induced voltage across the secondary winding L2 and generate the voltage $V_{out}$ between the output ports E and F. Simultaneously, the capacitors C4 and C5 is alternately charged to store the electric energy therein.

On the output side of the transformer 20, the voltage depending on the turns ratio of the transformer 20 and a change in the current flowing to the primary winding L1 is induced in the secondary winding L2. This voltage is rectified by the rectifier circuit 40. The rectified voltage is smoothed by the inductor L3 and the capacitor C2. The smoothed voltage $V_0$ is outputted as the output voltage $V_{out}$ to the output ports E and F. At the normal operation, as shown in FIG. 4E, the output voltage $V_{out}$ becomes a voltage value $V_o$ (See FIG. 4E).

Further, the control circuit 50 adjusts the durations of the control signals for of the switching elements S5 and S6. Accordingly, the waveform of the current flowing through the primary winding L1 is adjusted, and the voltage induced across the secondary winding L2 can be changed. It should be noted that the durations of the control signals for the switching elements S5 and S6 may not be necessarily constant.

The operation after the AC power failure will be described. Assume that the AC power failure occurs at the time $t_{14}$ and the voltage $V_i$ suddenly falls to and becomes zero (See FIG. 4A). The switching elements S5 and S6 continue the switching operation in the same manner as that of the normal operation. During the period in which the switching element S5 is ON and the switching element S6 is OFF, the current path including the capacitor C4 is formed between the connecting terminals N1 and N2. And, the capacitance of the capacitor C3 between the input ports A and B is sufficiently smaller than that the capacitor C4 so that a current starts flowing through the capacitor C3. Accordingly, a closed circuit is formed to include the capacitor C3, the primary winding L1, and the capacitor C4. The electric energy stored in the capacitor C4 then starts being discharged so that a current flow flows through the primary winding L1. Therefore, the transformer 20 is energized to induce a voltage across the secondary winding L2. Thus, the output voltage $V_{out}$ appears between the output ports E and F.

During the period in which the switching element S5 is OFF and the switching element S6 is ON, a current path including the capacitor C5 is formed between the connecting terminals N1 and N2. Accordingly, another closed circuit is formed to include the capacitor C3, the primary winding L1, and the capacitor C5. The electric energy stored in the capacitor C5 then starts being discharged so that a current flow flows through the primary winding L1. Therefore, the transformer 20 is energized to induce a voltage across the secondary winding L2. Thus, the output voltage $V_{out}$ appears between the output ports E and F.

As described above, the electric energy stored in the capacitors C4 and C5 is alternately supplied to the primary winding L1 as a current flow. As a result, the transformer 20 is energized to induce a voltage across the secondary winding L2. The induced voltage is rectified by the rectifier circuit 40. The rectified voltage is smoothed by the inductor L3 and the capacitor C2. The output voltage $V_{out}$ maintains appearing between the output ports E and F.

However, electric power does not supply to the power supply device 1 from outside any more after the AC power failure occurs. Therefore, the energy stored in the capacitors C4 and C5 is consumed by the primary winding L1 and any other resistor element. Accordingly, the magnitude of the voltage $V_B$ gradually drops so that the output voltage $V_{out}$ also drops from the value $V_0$ as the time elapses. At the time $t_{15}$, the output voltage $V_{out}$ becomes $V_0-\Delta V$. If the voltage value $V_0-\Delta V$ is set to the minimum drive voltage for the electronic device 60 connected to the power supply device 1, $t=t_{15}-t_{14}$ becomes the holding time for the AC power failure.

As described above, during the normal operation of the power supply device 1, the transformer 20 is energized and the capacitors C4 and C5 are charged by the AC power supply 10. When an AC power failure occurs, a closed circuit is formed to alternately include one of the capacitors C4 and C5 by the switching operation of the switching elements S5 and S6. Then, the electric energy stored in the capacitors C4 and C5 is supplied to the primary winding L1 so that the transformer 20 continues being energized. Thus, the induction of a voltage across the secondary winding L2 is maintained even after the AC power failure occurs. Therefore, the output voltage $V_{out}$ can continuously appear between the output ports E and F.

If the capacitances of the capacitors C4 and C5 are adjusted, the length of the holding time for maintaining an output $V_{out}$ more than or equal to a predetermined voltage can be adjusted. Thus, a desired holding time can be assured. Accordingly, malfunction or the stop of the operation of the electronic device fed by the power supply device 1 can be prevented.

Moreover, in this embodiment, the capacitors C4 and C5 are provided on the primary side of the transformer 20. In many cases, the output voltage $V_{out}$ is set to about 40 volts. As seen from FIG. 1, the configuration on the primary side of the transformer 20 is a step-up circuit, because the primary winding L1 is connected in series with the AC power supply 10. Accordingly, a voltage more than or equal to 400 volts, which is higher that the voltage on the secondary side of the transformer 20, is applied across the capacitors C4 and C5. Compared with the structure in which a capacitor for storing electric energy is provided on the secondary side, the capacitors C4 and C5 having smaller capacitances can be used on the primary side of the transformer 20 in the power supply device 1. Two capacitors are used to form the switching unit 30A, so that the number of elements required to provide the power supply device 1 can be reduced. The size of each part can be minimized and the cost for manufacturing the power supply device 1 can be reduced.

Further, in this embodiment, the rectifier circuit is provided only on the secondary side of the transformer 20. Accordingly, the circuit configuration makes simple. The number of parts and the cost for manufacturing the power supply device 1 can be reduced, compared with a power supply device 1 including two rectifiers. Furthermore, the power efficiency of the power supply device 1 can be improved.

In this embodiment, the power supply device 1 is operated by the switching operation of the switching elements S5 and S6. Accordingly, the power supply device 1 becomes a power factor improving circuit.

It is understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

For example, the configuration of the auxiliary power supply is not limited to the above switching unit 30 or 30A. Another configuration of a switching unit 30 may be employed if similar effects and advantages can be obtained. Further, the switching timing, switching frequency, and duration of the control signals for the switches S1 to S6 are not limited to the above-mentioned embodiments.

In another embodiment, any switching element such as an FET for connecting the input ports A and B can be used instead of the capacitor C3 to make a closed circuit after an AC power failure occurs. In this case, the switching element is closed to form the closed circuit by the controller 50 when the AC power failure occurs.

What is claimed is:

1. A power supply device comprising:
   first and second input ports for receiving alternating current having an input voltage;
   a transformer having a primary winding and a secondary winding, the primary winding having a pair of primary winding terminals, one of which is connected to the first port; and
   a switching circuit connected between another of the pair of primary winding terminals and the second port, the switching circuit comprising first, second, third, and forth switching elements and a capacitor, the first and second switching elements being connected to the other of the pair of primary winding terminals, respectively, the third switching element being connected between an other end of the first switching element and the second port, and the forth switching element being connected between an other end of the second switching element and the second port, the capacitor being connected between a connecting point of the first and third switching elements and another connecting point of the second and forth switching elements, wherein the capacitor is charged with energy obtained by the primary winding during a normal operation of the power supply device, the energy stored in the capacitor is supplied to the transformer through a current path provided between the first input port and the second input port to continue feed of electric power to the secondary winding when the input voltage decreases to or less than a predetermined value.

2. The power supply device according to claim 1, further comprising another capacitor connected between the first and second input ports to provide the current path.

3. The power supply device according to claim 1, further comprising a fifth switching element connected between the first and second input ports to provide the current path, wherein when the input voltage decreases to or less than the predetermined value, the fifth switching element is closed, otherwise, the fifth switching element is opened.

4. A power supply device comprising:
first and second input ports for receiving alternating current;
a transformer having a primary winding and a secondary winding, the primary winding having a pair of primary winding terminals, one of which is connected to the first port; and
a switching circuit connected between another of the pair of primary winding terminals and the second port, the switching circuit comprising first and second switching elements, and first and second capacitors, the first and second switching elements being connected to the other winding end of the primary winding, respectively, the first capacitor being connected between the other end of the switching element and the second port, the second capacitor being connected between the other end of the second switching element and the second port, wherein
the first and second capacitor are charged with energy obtained by the primary winding during a normal operation of the power supply device,
the energy stored in the first and second capacitor is supplied to the transformer through a current path provided between the first port and the second port to continue feed of electric power to the secondary winding when the input voltage decreases to or less than a predetermined value.

5. The power supply device according to claim 4, further comprising another capacitor connected between the first and second input ports to provide the current path.

6. The power supply device according to claim 4, further comprising a fifth switching element connected between the first and second input ports to provide the current path, wherein when the input voltage decreases to or less than the predetermined value, the fifth switching element is closed, otherwise, the fifth switching element is opened.

7. A power supply device comprising:
two input ports for receiving input alternating current power having an input voltage;
two output ports;
a transformer having a primary winding and a secondary winding, the primary winding having a first primary winding terminal connected to one of the two input ports and a second primary winding terminal, the secondary winding being connected to the two output ports;
a switching means connected in series with the primary winding through the second primary winding terminal, the series-connected primary winding and switching means being connected to the two input ports,
the switching means comprising first, second, third, and forth switching elements, and a first capacitor,
the first switching element being connected in series with the second switching element through a first node, the series connected first and second switching elements being connected between the second primary winding terminal and another of the two input ports,
the third switching element being connected in series with the forth switching element through a second node, the series connected third and forth switching elements being connected between the second primary winding terminal and the other of the two input ports,
the first capacitor being connected between the first and second nodes;
a second capacitor connected in parallel to the series-connected primary winding and switching means;
a controller for switching the first, second, third, and forth switching elements to charge the first capacitor periodically; wherein
electrical energy stored in the first capacitor is discharged to the primary winding when the input voltage decreases to or less than a predetermined value, thereby continuing feed of power to the transformer.

8. A power supply device comprising:
two input ports for receiving input alternating current power having an input voltage;
two output ports;
a transformer having a primary winding and a secondary winding, the primary winding having a first primary winding terminal connected to one of the two input ports and a second primary winding terminal, the secondary winding being connected to the two output ports;
a switching means connected between the second primary winding terminal and another of the two input ports, the switching means comprising a first switching element and a first capacitor which are connected in series to each other between the second primary winding terminal and the other of the two input ports, and a second switching element and a second capacitor which are connected in series between the second primary winding terminal and the other of the two input ports;
a third capacitor connected in parallel to the series-connected primary winding and switching means,
a controller for switching the first and second switching elements to charge the first and second capacitors, respectively; wherein
electrical energy stored in the first and second capacitors is discharged to the primary winding when the input voltage decreases to or less than a predetermined value, thereby continuing feed of power to the transformer.

* * * * *